US009387873B2

(12) United States Patent
Kiyota et al.

(10) Patent No.: US 9,387,873 B2
(45) Date of Patent: Jul. 12, 2016

(54) POWER ASSIST APPARATUS (71) Applicant: NSK LTD., Tokyo (JP)

(72) Inventors: Haruhiko Kiyota, Maebashi (JP);
Takeshi Murakami, Fujisawa (JP)

(73) Assignee: NSK LTD., Tokyo (JP)

( * ) Notice: Subject to any disclaimer, the term of this patent is extended or adjusted under 35 U.S.C. 154(b) by 118 days.

(21) Appl. No.: 14/239,646

(22) PCT Filed: Sep. 28, 2012

(86) PCT No.: PCT/JP2012/075142
§ 371 (c)(1),
(2) Date: Feb. 19, 2014

(87) PCT Pub. No.: WO2013/047777
PCT Pub. Date: Apr. 4, 2013

(65) Prior Publication Data
US 2014/0190762 A1    Jul. 10, 2014

(30) Foreign Application Priority Data

Sep. 28, 2011  (JP) ................................ 2011-211959

(51) Int. Cl.
*B62D 5/04*    (2006.01)
*B62D 6/10*    (2006.01)
(Continued)

(52) U.S. Cl.
CPC ............ *B62D 5/0403* (2013.01); *B62D 5/0409* (2013.01); *B62D 6/10* (2013.01); *G01L 3/101* (2013.01); *G01L 5/221* (2013.01)

(58) Field of Classification Search
CPC .. B62D 5/0403; B62D 5/0409; B62D 5/0454; B62D 3/12; B62D 6/10

USPC .................................................. 180/443, 444
See application file for complete search history.

(56) References Cited

U.S. PATENT DOCUMENTS 5,927,429 A *  7/1999  Sugino ..................... B62D 3/12
                                                                  180/444
6,000,491 A * 12/1999  Shimizu .................. B62D 6/10
                                                                  180/444
(Continued)

FOREIGN PATENT DOCUMENTS

JP    2001-138932 A    5/2001
JP    2004-93183 A     3/2004
(Continued)

OTHER PUBLICATIONS

International Search Report (PCT/ISA/210), dated Dec. 11, 2012, issued by the International Searching Authority in counterpart International Patent Application No. PCT/JP2012/075142.
(Continued)

*Primary Examiner* — Anne Marie Boehler
(74) *Attorney, Agent, or Firm* — Sughrue Mion, PLLC (57) ABSTRACT

A power assist apparatus includes an electric motor, a speed reducer, an annular torque sensor, a housing in which the speed reducer and the torque sensor are arranged, and an annular center aligning bracket. The housing includes a first housing element and a second housing element, and one of the first housing element and the second housing element is made of a synthetic resin. The center aligning bracket is fixed to the one of the first housing element and the second housing element by insert molding such that the center aligning bracket is concentric to the one of the first housing element and the second housing element. The first housing element and the second housing element are joined such that the first housing element and the second housing element are engaged with each other in an axial direction of the torque sensor via the center aligning bracket.

5 Claims, 10 Drawing Sheets

(51) Int. Cl.
*G01L 5/22* (2006.01)
*G01L 3/10* (2006.01)

(56) References Cited

U.S. PATENT DOCUMENTS

| 2004/0182177 A1* | 9/2004 | Nakajima | B62D 5/0406 |
| | | | 73/862.193 |
| 2009/0050399 A1* | 2/2009 | Segawa | B62D 1/20 |
| | | | 180/444 |

FOREIGN PATENT DOCUMENTS

| JP | 2004-233291 A | 8/2004 |
| JP | 2005-172433 A | 6/2005 |
| JP | 2005-319856 A | 11/2005 |
| JP | 2006-62535 A | 3/2006 |
| JP | 2008-137600 A | 6/2008 |
| JP | 2008-213674 A | 9/2008 |
| JP | 2009-298246 A | 12/2009 |
| JP | 2010-52510 A | 3/2010 |
| JP | 2010-249734 A | 11/2010 |

OTHER PUBLICATIONS

Written Opinion (PCT/ISA/237), dated Dec. 11, 2012, issued by the International Searching Authority in counterpart International Patent Application No. PCT/JP2012/075142.

Search Report issued Jun. 15, 2015, issued by the European Patent Office in counterpart European Patent Application No. 12834901.6.

\* cited by examiner

POWER ASSIST APPARATUS

TECHNICAL FIELD

The present invention relates to a power assist apparatus of an electrically assisted power steering apparatus.

BACKGROUND ART

Figure 8:
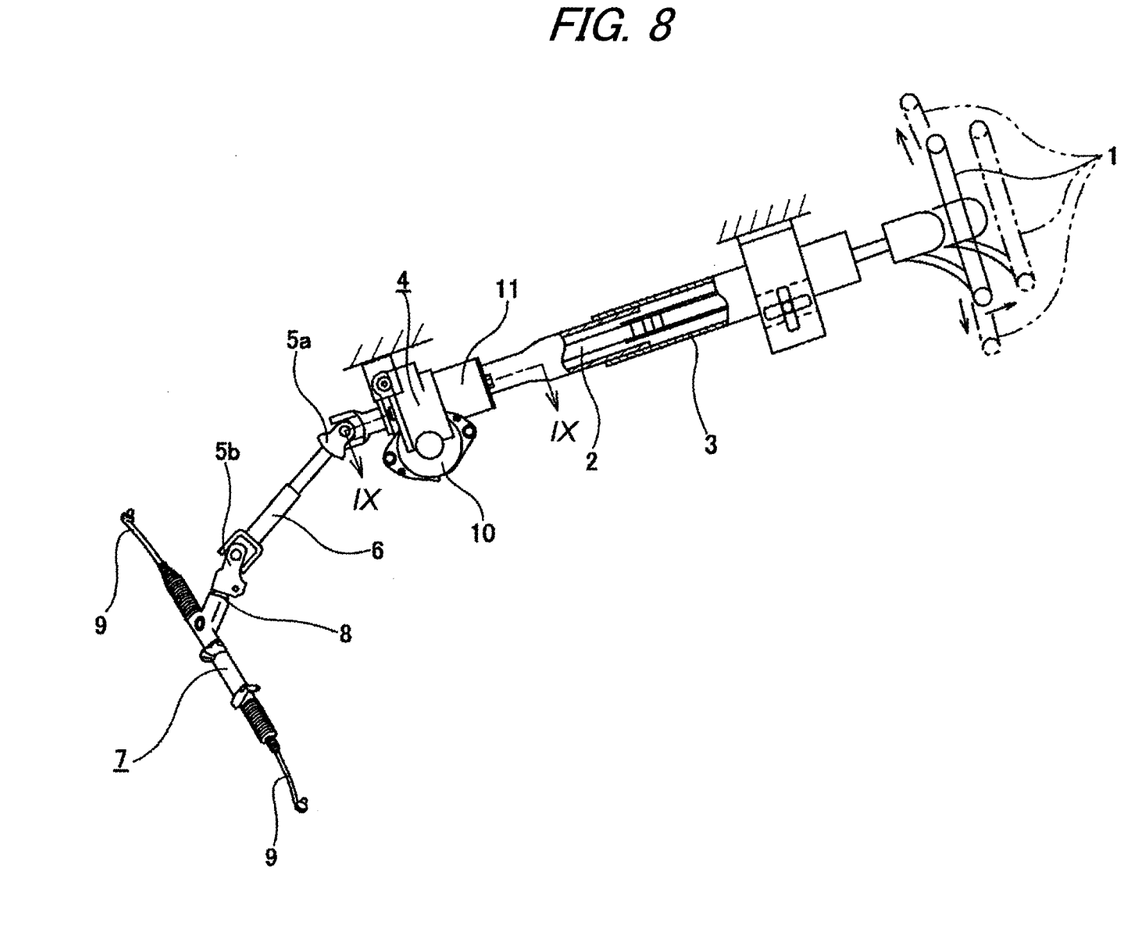
FIG. 8 is a side view illustrating an example of an electrically assisted power steering apparatus that is partially cut away.

FIG. 8 shows an example of an electrically assisted power steering apparatus. In this specification, a front-rear direction is based on the traveling direction of a vehicle. Therefore, in FIGS. 1, 5, 8, and 9, the left sides become the front and the right sides become the rear. As shown in FIG. 8, an electrically assisted power steering apparatus includes a steering wheel 1, a steering shaft 2 having a rear end portion to which the steering wheel 1 is fixed, a cylindrical steering column 3 supporting the steering column 3 therein such that the steering column 3 is rotatable, and a power assist apparatus 4. The motion of the steering wheel 1 is transmitted to an input shaft 8 of a steering gear unit 7 through the steering shaft 2, the power assist apparatus 4, a universal joint 5a, an intermediate shaft 6, and another universal joint 5b. If the input shaft 8 rotates, a pair of tie rods 9 disposed on both sides of the steering gear unit 7 is pushed and pulled, whereby a rudder angle according to the amount of operation of the steering wheel 1 is applied to left and right steered wheels.

Figure 9:
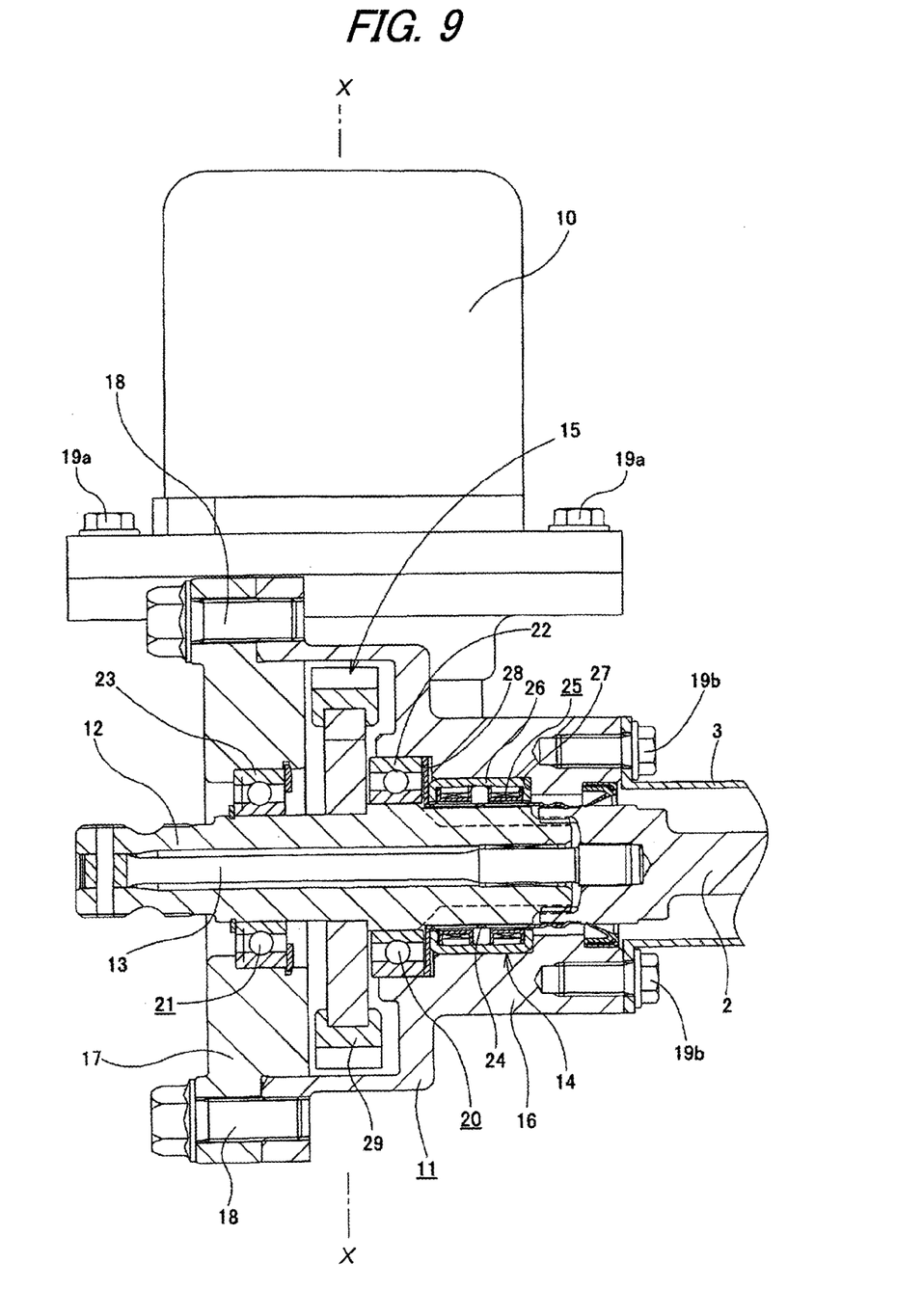
FIG. 9 is a sectional view of a power assist apparatus taken along the line IX-IX of FIG. 8.
Figure 10:
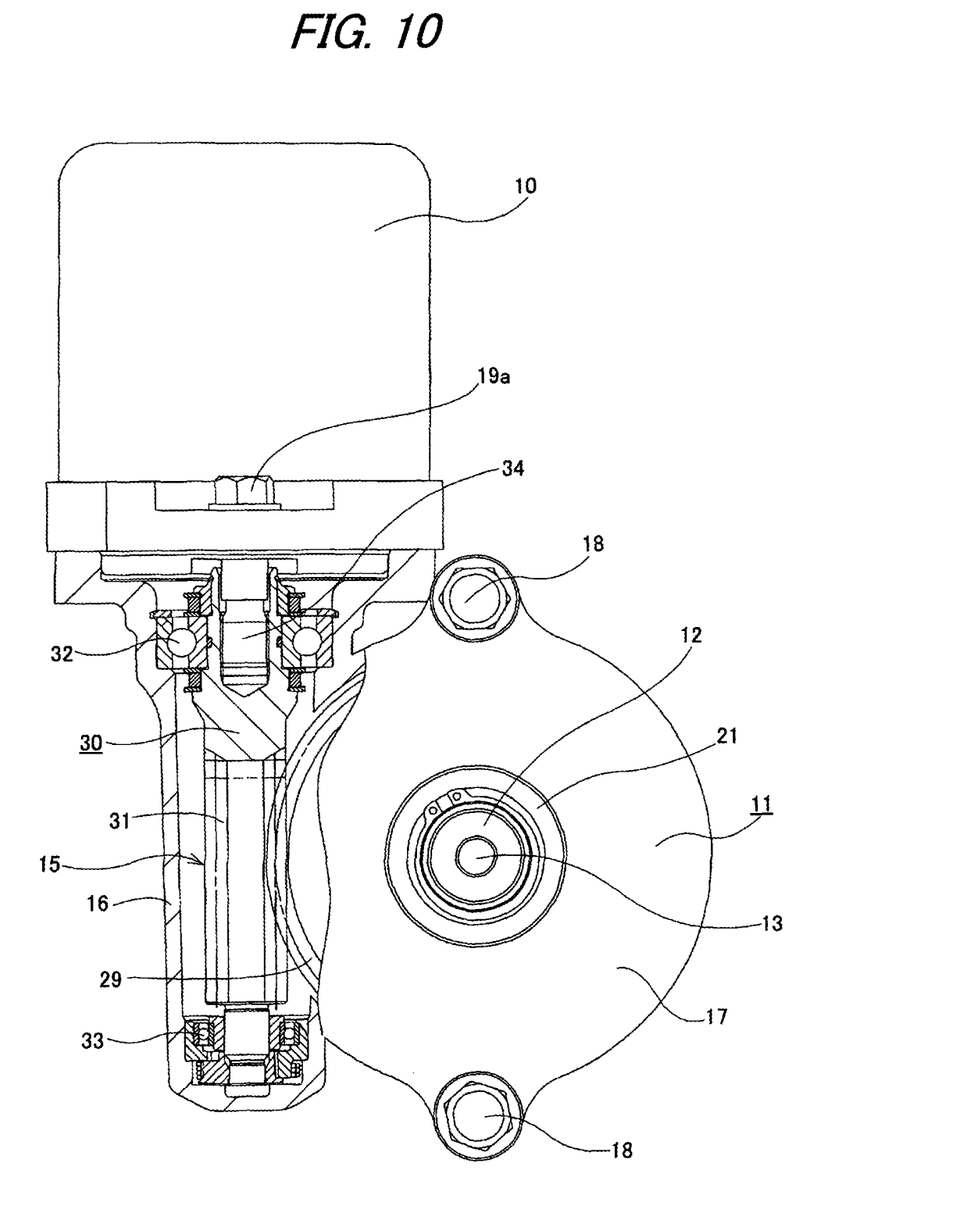
FIG. 10 is a front view of the power assist apparatus, partially illustrating a cross section along a line X-X of FIG. 9.

As shown in FIGS. 9 and 10, the power assist apparatus 4 includes an electric motor 10 which is an auxiliary power source, a hollow metal housing 11, an output shaft 12 which is an assisted shaft, a torsion bar 13, a torque detector 14, and a worm speed reducer 15. The output shaft 12, the torsion bar 13, the torque detector 14, and the worm speed reducer 15 are disposed inside the housing 11. The housing 11 can be divided into two parts in the front-rear direction. In other words, the housing 11 includes a hollow first housing element 16 forming the intermediate portion and the rear end portion of the housing 11, and an annular second housing element 17 forming the front end portion of the housing 11. The front end portion of the first housing element 16 and the rear end portion of the second housing element 17 are fitted together with sufficient coaxiality being ensured, and are joined by a plurality of bolts 18 (two bolts in the example shown in FIGS. 9 and 10). The electric motor 10 is fixed to a side of the first housing element 16 by a plurality of bolts 19a. The front end portion of the steering column 3 is fixed to the rear end surface of the first housing element 16 by a plurality of bolts 19b.

The output shaft 12 is disposed in the front-rear direction and is supported by first and second ball bearings 20, 21 such that the output shaft 12 is rotatable inside the housing 11. The outer ring 22 of the first ball bearing 20 is fitted into and fixed to a front end side portion of the intermediate portion of the first housing element 16, and the outer ring 23 of the second ball bearing 21 is fitted into and fixed to the second housing element 17. Further, the front end portion of the steering shaft 2 is connected to the output shaft 12 through the torsion bar 13. A part of the front end portion of the output shaft 12 protruding to the outside of the housing 11 is joined with the universal joint 5a (see FIG. 8).

The torque detector 14 includes a torque detecting sleeve 24, and an annular torque sensor 25 disposed around the torque detecting sleeve 24. The torque detecting sleeve 24 is fitted onto and fixed to the front end portion of the steering shaft 2 and then is disposed around the rear end portion of the output shaft 12. The torque sensor 25 includes a cylindrical sensor case 26 having inward flange portions at both ends in an axial direction, and a sensor coil held inside the sensor case 26. The torque sensor 25 is interposed between a step portion 27 provided at the inner circumferential surface of the first housing element 16 and a disc spring 28 superimposed on a side of the outer ring 22 of the first ball bearing 20, thereby being positioned in the axial direction, and is fitted into and fixed to the first housing element 16.

The worm speed reducer 15 includes a worm wheel 29, a worm shaft 30, and a worm 30 which is provided at the intermediate portion of the worm shaft 30 and is meshed with the worm wheel 29. The worm wheel 29 is fitted onto and fixed to a portion of the intermediate portion of the output shaft 12 between the first and second ball bearings 20, 21 by serration engagement or the like. Both end portions of the worm shaft 30 are supported by third and fourth ball bearings 32, 33 such that the worm shaft 30 is rotatable with respect to both end portions of the lower portion of the first housing element 16. The base portion of the worm shaft 30 (the upper end portion in FIG. 10) is joined with a drive shaft 34 of the electric motor 10 such that torque transmission is possible.

In the electrically assisted power steering apparatus having the above-mentioned configuration, if a torque is applied from the steering wheel 1 to the steering shaft 2, the torque detector 14 detects the direction and magnitude of the torque. In other words, if a torque is applied from the steering wheel 1 to the steering shaft 2, the torsion bar 13 connecting the steering shaft 2 and the output shaft 12 is elastically deformed in a twist direction. According to this elastic deformation, the steering shaft 2 and the output shaft 12 rotate relatively. The amount of relative rotation and the direction and magnitude of the torque have a correlation. Therefore, the torque detector 14 detects the direction and magnitude of the torque on the basis of the amount of relative rotation. On the basis of the torque detection result, the electric motor 10 rotates the output shaft 12 through the worm speed reducer 15 with a torque larger than the torque input from the steering wheel 1 to the steering shaft 2. Therefore, it is possible to reduce the operation force of the steering wheel 1 necessary for applying a rudder angle to the left and right steered wheels.

With respect to a power assist apparatus of an electrically assisted power steering apparatus, in order to reduce the weight and cost of a housing of the power assist apparatus, it has been considered to make the housing of a synthetic resin. For example, there has been proposed a structure in which with respect to a pair of housing elements forming a housing, one of the housing element is made of a metal and the other housing element is made of a synthetic resin (see, e.g., Patent Document 1). However, in this structure, in a state in which the end portions of the housing elements are fitted together to assemble the housing, the sufficient coaxiality of the housing elements may not be obtained. That is, shape accuracy and size accuracy of synthetic resin housing element are inferior to shape accuracy and size accuracy of a metal housing element. Accordingly, when sufficient shape accuracy and size accuracy of the synthetic resin housing element are not obtained, in a state in which the end portions of the housing elements are fitted together, sufficient coaxiality of the housing elements cannot be ensured.

Also, there has been proposed a structure in which two housing elements are made of a synthetic resin, and the end portions of the housing elements are welded (see e.g., Patent Document 2). In this case, because both of the housing elements are made of synthetic resin, there is higher likelihood of not being able to sufficiently ensure the coaxiality of the housing elements, for the reasons mentioned above.

In either case, if the coaxiality of the housing elements cannot sufficiently be ensured, also the coaxiality of components to be disposed concentrically to each other (the bearings, the assisted shaft, the torsion bar, the torque detecting sleeve, the torque sensor, and the like) among components attached to the inside of one housing element and components attached to the inside of the other housing element cannot sufficiently be ensured. As a result, during the operation of the power assist apparatus, an excessive force may be applied to each corresponding component, whereby the durability of those components may be reduced or the accuracy of the torque detection of the torque detector may be lowered. Further, there is also a possibility of not being able to assemble the power assist apparatus.

PRIOR ART DOCUMENTS

Patent Documents

Patent Document 1: JP 2005-172433 A
Patent Document 2: JP 2009-298246 A

SUMMARY OF INVENTION

Problem to be Solved by Invention

It is an object of the present invention to provide a power assist apparatus with a housing having a pair of housing elements, at least one of the housing elements is made of a synthetic resin, and the coaxiality of the housing elements can sufficiently be ensured in a state in which end portions of the housing elements are engaged with each other.

Means for Solving the Problem

According to an aspect of the invention, a power assist apparatus includes an electric motor, a speed reducer configured to increase a torque generated by the electric motor, an annular torque sensor configured to detect a torque input from a steering wheel to a steering shaft attached to the steering wheel, a housing in which the speed reducer and the torque sensor are arranged, and an annular center aligning bracket. The housing includes a first housing element and a second housing element, and one of the first housing element and the second housing element is made of a synthetic resin. The center aligning bracket is fixed to the one of the first housing element and the second housing element by insert molding such that the center aligning bracket is concentric to the one of the first housing element and the second housing element. The first housing element and the second housing element are joined such that the first housing element and the second housing element are engaged with each other in an axial direction of the torque sensor via the center aligning bracket.

That is, in a case where only one of the first and second housing elements is made of synthetic resin, a center aligning bracket fixed to this one of the housing elements is engaged with a portion of the other of the housing elements. In a case where both of the first and second housing elements are made of synthetic resin, center aligning brackets fixed to the respective housing elements are engaged with each other.

The speed reducer may includes a worm shaft connected to a drive shaft of the electric motor, a worm provided on the worm shaft, and a worm wheel meshed with the worm.

The power assist apparatus may further include an output shaft arranged along the axial direction inside the housing and onto which the worm wheel is fitted in a fixed manner, an output shaft rolling bearing supporting the output shaft in a rotatable manner, and an annular output shaft bearing holder into which an outer ring of the output shaft rolling bearing is fitted in a fixed manner, and the output shaft bearing holder may be made of a metal, and may be fixed to the one of the first housing element and the second housing element such that the bearing holder is concentric to the center aligning bracket.

The output shaft bearing holder may preferably be fixed to the synthetic resin housing element by insert molding, but may alternatively be fixed by bonding, interference fitting (press fitting), or the like.

The center aligning bracket and the output shaft bearing holder may be formed as one piece.

The torque sensor may be positioned with respect to the axial direction by the output shaft bearing holder, and may be fixed to the one of the first housing element and the second housing element.

The power assist apparatus may further include a pair of worm shaft rolling bearings supporting respective end portions of the worm shaft in a rotatable manner, and a pair of annular worm shaft bearing holders into which outer rings of the pair of worm shaft rolling bearings are fitted in a fixed manner respectively, and the pair of worm shaft bearing holders may be made of a metal, and may be fixed to the one of the first housing element and the second housing element such that the worm shaft bearing holders are concentric to one another.

The worm shaft bearing holder may preferably be fixed to the synthetic resin housing element by insert molding, but may alternatively be fixed by bonding, press fitting (interference fitting), or the like.

Advantage of Invention

With a power assist apparatus according to an aspect of the invention, it is possible to sufficiently ensure the coaxiality of the housing elements while making at least one of the housing elements for reducing weight and cost of the housing.

EMBODIMENTS OF INVENTION

FIGS. 1 to 4 show a power assist apparatus according to an embodiment of the present invention. The present embodiment is different from the above-mentioned example shown in FIGS. 8 to 10, for example, in the materials of first and second housing elements 16a, 17a forming a housing 11a, the structures of joining portions of the first and second housing elements 16a, 17a, and the structures of assembly portions of other components with respect to the first and second housing elements 16a, 17a. Drawing and description with respect to the same or equivalent features as or to those of the example shown in FIGS. 8 to 10 will be omitted or be simply made, and the present embodiment will hereinafter be described in detail.

In a case of the present embodiment, the first and second housing elements 16a, 17a are made of a synthetic resin. In FIGS. 1 to 4, portions corresponding to the first and second housing elements 16a, 17a are given diagonal lattices. The first and second housing elements 16a, 17a are joined through first and second center aligning brackets 35, 36. In other words, at the front end portion of the first housing element 16a, the first center aligning bracket 35 having an annular shape is fixed concentrically to the first housing element 16a by insert molding. The first center aligning bracket 35 includes a first cylindrical portion 37, a pair of first attachment plate portions 38, 38 bent at right angles radially outward from the positions of two parts on the opposite side to the front end edge of the first cylindrical portion 37 in a radial direction, and screw holes 39, 39 formed at the center portions of the first attachment plate portions 38, 38. In the embodiment shown in FIGS. 1 to 4, at portions of the front end portion of the first housing element 16a to be aligned with the screw holes 39, 39, screw holes 39a and 39a to be connected to the screw holes 39, 39 are formed. The screw holes 39a and 39a may be simple through-holes.

At a portion on the outer circumference of the second housing element 17a, the second center aligning bracket 36 having an annular shape is fixed concentrically to the second housing element 17a by insert molding. The second center aligning bracket 36 includes a second cylindrical portion 40, an annular flange portion 41 bent at a right angle radially outward from the front end edge of the second cylindrical portion 40, a pair of second attachment plate portions 42, 42 protruding radially outward from the positions of two parts on the opposite side to the flange portion 41 in the radial direction, and through-holes 43, 43 formed at the center portions of the second attachment plate portions 42, 42. The first cylindrical portion 37 is fitted onto the second cylindrical portion 40 without slip, and sides of the first attachment plate portions 38, 38 and the second attachment plate portions 42, 42 facing each other are brought into contact with each other. Further, in this state, the stem portions of a pair of bolts 18, 18 inserted into the through-holes 43, 43 formed at the second attachment plate portions 42, 42 are screwed into the screw holes 39, 39 formed at the first attachment plate portions 38, 38, thereby being further tightened. In this way, the first and second housing elements 16a, 17a are joined together.

The first and second ball bearings 20, 21 (output shaft rolling bearings) support the output shaft 12 in a rotatable manner. The outer rings 22, 23 of the first and second ball bearings 20, 21 are fitted into the first and second housing elements 16a, 17a in a fixed manner via first and second holders 44, 45 (output shaft bearing holders). In other words, at a portion of the first housing element 16a facing the outer circumferential surface and rear end surface of the outer ring 22 which is portion around the outer ring 22 of the first ball bearing 20, the first holder 44 made of metal and having an annular shape is fixed concentrically to the first center aligning bracket 35 by insert molding. The first holder 44 includes a cylindrical portion 46, and a circular ring portion 47 bent at a right angle radially inward from the rear end portion of the cylindrical portion 46. The outer ring 22 of the first ball bearing 20 is fitted into the cylindrical portion 46 by interference fitting. In this state, the rear end surface of the outer ring 22 is brought into contact with the front surface of the circular ring portion 47, whereby the outer ring 22 is positioned in an axial direction. In a case of the present embodiment, with respect to the first holder 44, not only the outer circumferential surface of the cylindrical portion 46 but also the rear surface of the circular ring portion 47 are bonded to the first housing element 16a, whereby the area of the bonded portion widens such that the strength of the bonding to the first housing element 16a is sufficiently ensured. If a concave groove is formed in the axial direction at the outer circumferential surface of the cylindrical portion 46, the synthetic resin for the first housing element 16a is put in the concave groove and is solidified, it is possible to enhance the bonding strength.

At an inner circumferential portion of the second housing element 17a which is a portion of the second housing element 17a around the outer ring 23 of the second ball bearing 21, the second holder 45 made of metal and having an annular shape is fixed concentrically to the second center aligning bracket 36 by insert molding. The second holder 45 includes a cylindrical portion 48, and a circular ring portion 49 bent at a right angle radially inward from the rear end portion of the cylindrical portion 48. The outer ring 23 of the second ball bearing 21 is fitted into the cylindrical portion 48 by interference fitting. In this state, the outer ring 23 is interposed between the circular ring portion 49 and a retaining ring 51 locked in a locking groove 50 formed at a the rear end side portion of the inner circumferential surface of the cylindrical portion 48 from both sides in the axial direction, whereby the outer ring 23 is positioned in the axial direction. In a case of the present embodiment, with respect to the second holder 45, the size of the bonded portion to the first housing element 16a in the axial direction is made larger than the size of the outer ring 23 of the second ball bearing 21 in the axial direction, whereby the area of the corresponding bonded portion is widened such that the strength of the bonding to the first housing element 16a is sufficiently ensured. With respect to the outer circumferential surface of the cylindrical portion 48, a concave groove may be formed for enhance the strength of the bonding.

The torque sensor 25 is fixed to a rear end side portion of the intermediate portion of the inner circumferential portion of the first housing element 16a, concentrically to the first center aligning bracket 35, by insert molding. The front end surface of the sensor case 26 of the torque sensor 25 is brought into contact with the rear surface of the circular ring portion 47 of the first holder 44. In this way, the torque sensor 25 is positioned in the axial direction.

The third and fourth ball bearings 32, 33 (worm shaft rolling bearings) support both end portion of a worm shaft 30 in a rotatable manner. The outer rings 52, 53 of the third and fourth ball bearings 32, 33 are fitted into the first housing element 16a in a fixed manner via third and fourth holders 54, 55 (worm shaft bearing holders). In other words, the third holder 54 made of metal and having an annular shape and the fourth holder 55 made of metal and having an annular shape are concentrically fixed to (fixed to by insert molding, or fitted in a fixed manner by interference fitting or bonding) a portion of the first housing element 16a around the base portion of the worm shaft 30 (an upper end portion in FIG. 2) and a third ball bearing 32 and a portion of the first housing element 16a around the front end portion of the worm shaft 30 (a lower end portion in FIG. 2) and a fourth ball bearing 33, respectively. The third holder 54 includes a cylindrical portion 56, and a circular ring portion 57 bent at a right angle radially inward from one end portion of the cylindrical portion 56 (the lower end portion in FIG. 2). The outer ring 52 of the third ball bearing 32 is fitted into the cylindrical portion 56 by interference fitting. In this state, the outer ring 52 is interposed between the circular ring portion 57 and a retaining ring 59 locked in a locking groove 58 formed at an intermediate portion of the inner circumferential surface of the cylindrical portion 56 from both sides in the axial direction, whereby the outer ring 52 is positioned in the axial direction. In a case of the present embodiment, with respect to the third holder 54, the size of at least the bonded portion or contact portion with respect to the first housing element 16a in the axial direction is made larger than the size of the outer ring 52 of the third ball bearing 32 in the axial direction, whereby the area of the bonded portion or contact portion is widened such that the strength of the bonding to the first housing element 16a is sufficiently ensured.

The fourth holder 55 includes a cylindrical portion 60 at one end portion (the upper end portion in FIG. 2) in the axial direction. The outer ring 53 of the fourth ball bearing 33 is fitted into the cylindrical portion 60 by interference fitting. In this state, the outer ring 53 is interposed between a step portion 61 formed at an intermediate portion of the inner circumferential surface of the fourth holder 55 and a caulking portion 62 formed by plastically deforming one end edge portion of the inner circumferential surface of the fourth holder 55 inward in the radial direction, from both sides in the axial direction, whereby the outer ring 53 is positioned in the axial direction. In a case of the present embodiment, with respect to the fourth holder 55, the size of at least the bonded portion or contact portion with respect to the first housing element 16a in the axial direction is made larger than the size of the outer ring 53 of the fourth ball bearing 33 in the axial direction, whereby the area of the bonded portion or contact portion is widened such that the strength of the bonding to the first housing element 16a is sufficiently ensured.

A mounting bracket 63 has an elliptical plate shape and has a center hole. The mounting bracket 63 is fixed to one end portion of the first housing element 16a (the upper end portion in FIGS. 1 and 2) at a right angle with respect to the axial directions of the third and fourth holders 54, 55 by insert molding. A metal motor housing 64 of an electric motor 10a is joined with and fixed to the mounting bracket 63 by a plurality of bolts 19a, 19a. At a portion of the motor housing 64 where the bolts 19a, 19a are disposed, through-holes into which the step portions of the bolts 19a, 19a are inserted are formed. At portions of the mounting bracket 63 to be aligned with those through-holes, screw holes into which the step portions of the bolts 19a, 19a are screwed are formed. A cylindrical portion 65 for alignment is provided at the front end portion of the motor housing 64 (the lower end portion in FIG. 2), concentrically to the drive shaft 34 of the electric motor 10a. The cylindrical portion 65 for alignment is fitted into the other end portion of the cylindrical portion 56 of the third holder 54 (the upper end portion in FIG. 2) without slip. Therefore, the coaxiality of the third ball bearing 32 and the drive shaft 34 is sufficiently ensured. At the rear end portion of the first housing element 16a, a plurality of metal nut cylinders 66, 66 are buried by insert molding. The step portions of the plurality of bolts 19a, 19a are screwed into the nut cylinders 66, 66, whereby the front end portion of the steering column 3 is fixed.

When forming the first housing element 16a by injection molding, components to be fixed to the first housing element 16a by insert molding are arranged in a mold with reference to the first center aligning bracket 35. In this state, the first housing element 16a is formed by injection molding, whereby the accuracy of the positions of the corresponding components is sufficiently ensured. When forming the second housing element 17a by injection molding, the second center aligning bracket 36 and the second holder 45 which are to be fixed to the second housing element 17a by insert molding are arranged in a mold with reference to the second center aligning bracket 36. In this state, the second housing element 17a is formed by injection molding, whereby the accuracy of the positions of the second center aligning bracket 36 and the second holder 45 is sufficiently ensured.

The synthetic resin forming the first and second housing elements 16a, 17a is not particularly limited as long as required strength, rigidity, and durability can be ensured. For example, it is possible to preferably use thermoplastic resins, such as polyamide-based resins (such as polyamide 6, polyamide 66, polyamide 6T/6-6, polyamide 6T/61, polyamide 6T/61/6-6, polyamide 6T/M-5T, and polyamide 9T), polyester-based resins (such as polyethylene terephthalate and polybutylene terephthalate), and polyphenylene sulfide resins, mixed with a reinforcement material such as glass fiber or carbon fiber.

The first and second center aligning brackets 35, 36 and the first to fourth holders 44, 45, 54, 55 are articles which are formed by press molding. The kinds of metal materials forming those articles which are formed by press molding are not particularly limited as long as required strength, rigidity, and durability can be ensured. For example, it is possible to use iron-based alloys such as carbon steel for machine structural use, bearing steel, cold rolled sheet steel (SPCC), hot rolled sheet steel (SPHC), and stainless steel (such as SUS430 and SUS410), and in view of weight saving, it is possible to preferably use light metals such as aluminum-based alloys and magnesium-based alloys.

Figure 1:
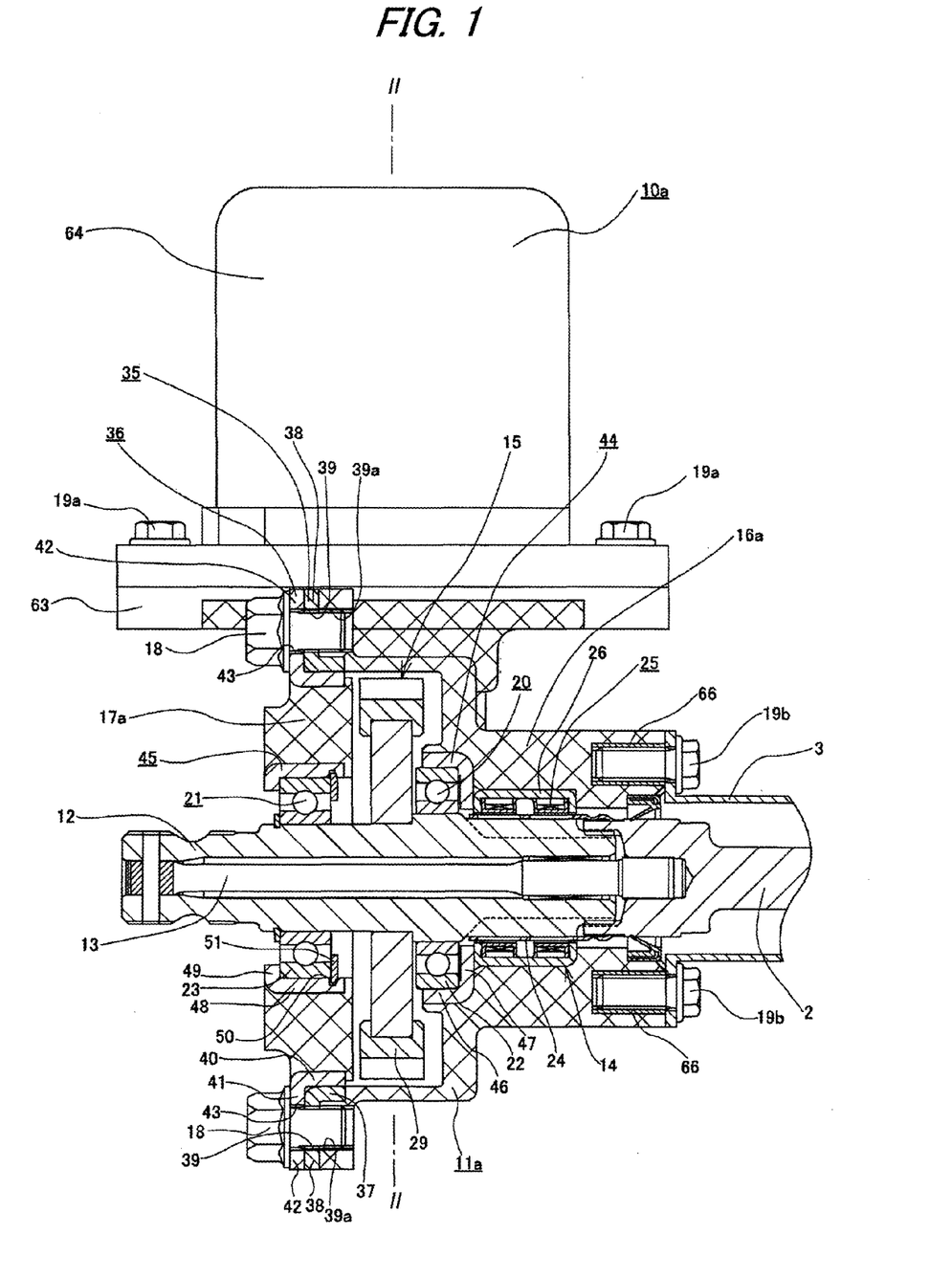
FIG. 1 is a sectional view of a power assist apparatus according to an embodiment of the present invention.
Figure 2:
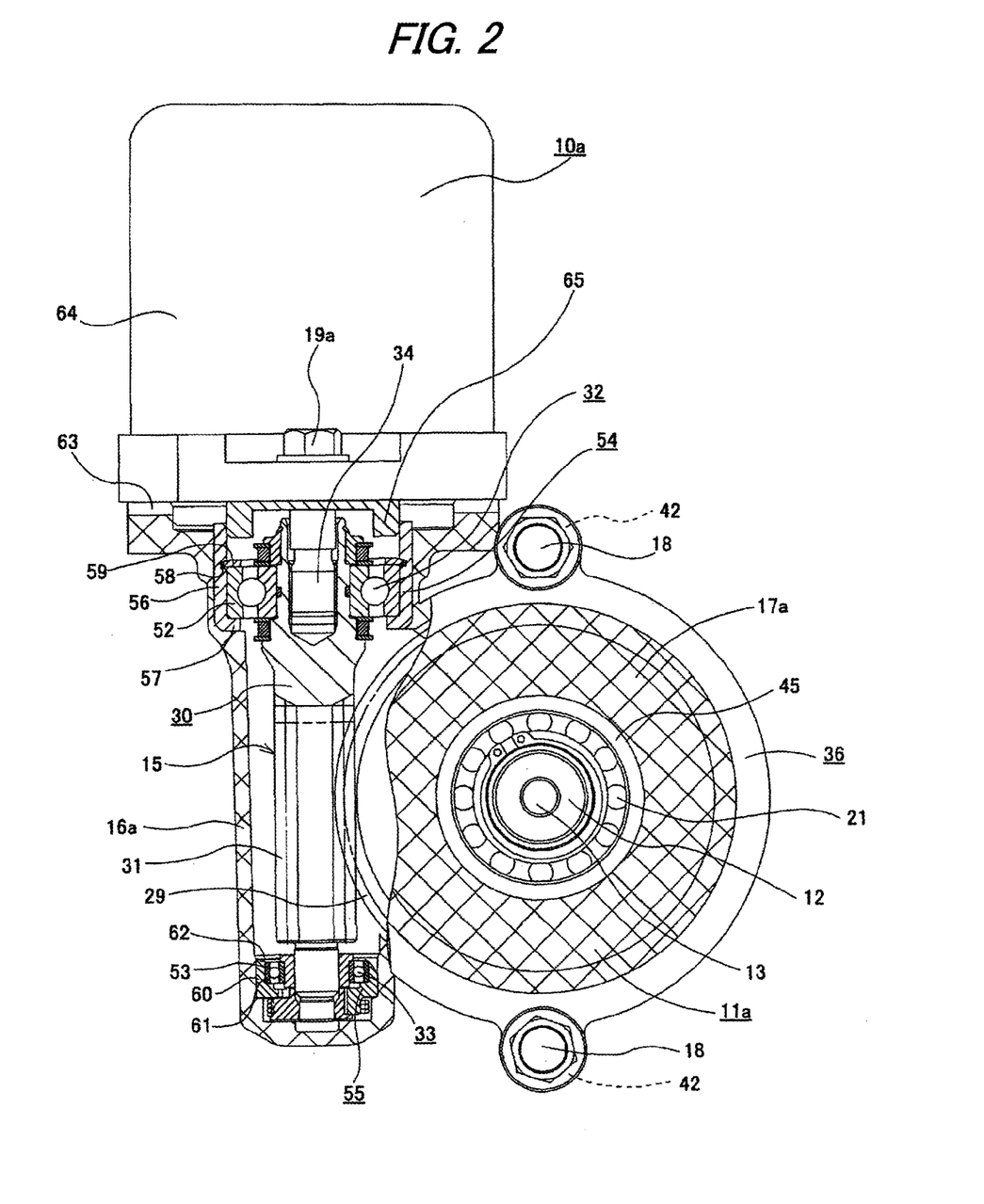
FIG. 2 is a front view of the power assist apparatus, partially illustrating a cross section along the line II-II of FIG. 1.
Figure 3:
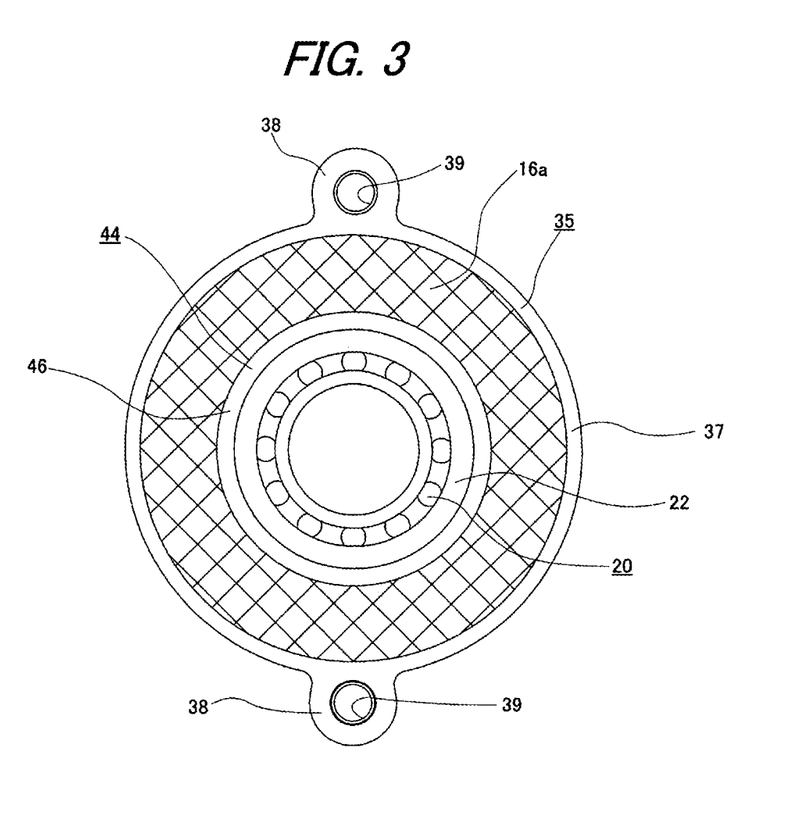
FIG. 3 is a front view of a portion of a first housing element, and a first holder and a first ball bearing fixed to the first housing element.
Figure 4:
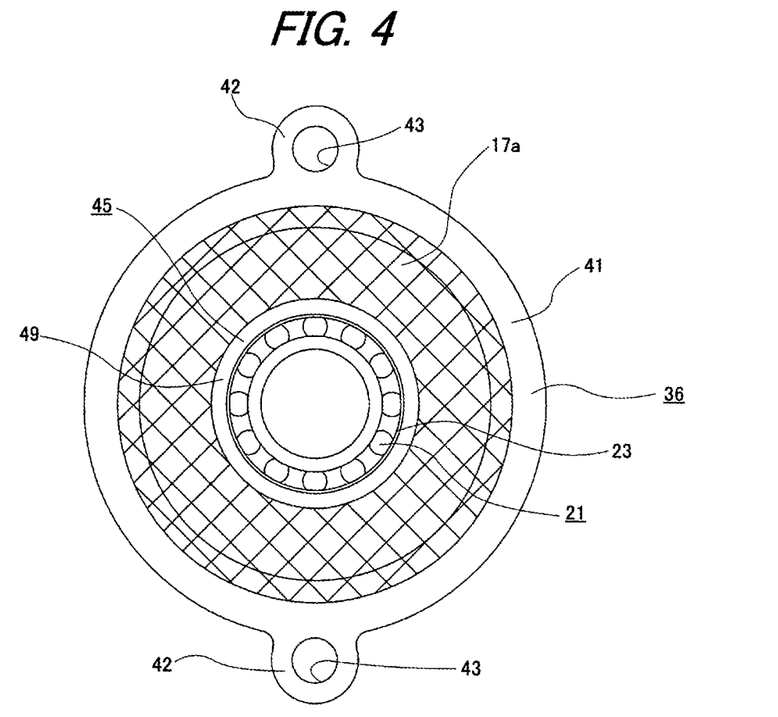
FIG. 4 is a front view of a second housing element, and a second holder and a second ball bearing fixed to the second housing element.

According to the power assist apparatus having the above-mentioned configuration, it is possible to sufficiently ensure the coaxiality of the first and second housing elements 16a, 17a when the first and second housing elements 16a, 17a are assembled while making the first and second housing elements 16a, 17a of a synthetic resin for reducing the weight and cost of the housing 11a. That is, at portions mutually engaging when attaching the first and second housing elements 16a, 17a together, the first and second center aligning brackets 35, 36 are fixed. Specifically, the first center aligning bracket 35 is fixed to the first housing element 16a, concentrically to the first housing element 16a by insert molding. The second center aligning bracket 36 is fixed to the second housing element 17a, concentrically to the second housing element 17a by insert molding. The first and second center aligning brackets 35, 36 are components made of metal, and can be made with good shape accuracy and size accuracy as compared to components made of synthetic resin. Accordingly, in a state in which the first and second center aligning brackets 35, 36 are fitted together as shown in FIG. 1, it is possible to sufficiently ensure the coaxiality of the first and second housing elements 16a, 17a. Therefore, it is possible to sufficiently ensure the coaxiality of components (the first and second ball bearings 20, 21, the torque sensor 25, the output shaft 12, the torsion bar 13, the torque detecting sleeve 24, and the like) to be disposed concentrically to each other among the components attached to the inner side of the first housing element 16a and the components attached to the inner side of the second housing element 17a.

The outer rings 22, 23 of the first and second ball bearings 20, 21 are fitted into the first and second housing elements 16a, 17a in a fixed manner via the first and second holders 44, 45. The first holder 44 is fixed to the first housing element 16a, concentrically to the first center aligning bracket 35 by insert molding. The second holder 45 is fixed to the second housing element 17a, concentrically to the second center aligning bracket 36 by insert molding. The first and second holders 44, 45 are components made of metal, and can be made with good shape accuracy and size accuracy as compared to components made of synthetic resin. Accordingly, in a state in which the first and second center aligning brackets 35, 36 are fitted together as shown in FIG. 1, it is possible to sufficiently ensure the coaxiality of the first and second ball bearings 20, 21. Also, the torque sensor 25 is fixed to the first housing element 16a, concentrically to the first center aligning bracket 35 by insert molding. Accordingly, it is also possible to sufficiently ensure the coaxiality of the torque sensor 25 and the first and second ball bearings 20, 21.

As described above, according to the present embodiment, it is possible to sufficiently ensure the coaxiality of components to be disposed concentrically to each other among the components attached to the inner side of the first housing element 16a and the components attached to the inner side of the second housing element 17a. Therefore, it is possible to prevent an excessive force from being applied to those components which otherwise may reduce the durability of the components or lower the accuracy of the torque detection of the torque sensor 25.

The first holder 44 positions the torque sensor 25 with respect to the first housing element 16a in the axial direction. Accordingly, it becomes unnecessary to provide a member only for positioning the torque sensor 25 with respect to the first housing element 16a in the axial direction. Therefore, it is possible to reduce the cost according to a reduction in the number of components. Also, since fixing of the torque sensor 25 to the first housing element 16a is performed by insert molding, it is possible to easily perform work of assembling the torque detector 14 including the torque sensor 25.

The outer rings 52, 53 of the third and fourth ball bearings 32, 33 are fitted into the first housing element 16a in a fixed manner via the third and fourth holders 54, 55. The third and fourth holders 54, 55 are fixed to the first housing element 16a, concentrically to each other. The third and fourth holders 54, 55 are components made of metal, and can be made with good shape accuracy and size accuracy as compared to components made of a synthetic resin. Accordingly, it is possible to sufficiently ensure the coaxiality of the third and fourth ball bearings 32, 33.

The outer rings 22, 23, 52, 53 of the first to fourth ball bearings 20, 21, 32, 33 are fitted into the first and second synthetic resin housing elements 16a, 17a in a fixed manner respectively, not directly but via the first to fourth metal holders 44, 45, 54, 55. Accordingly, it is possible to prevent creep from occurring at the fitting portions of the inner circumferential surfaces of the first to fourth holders 44, 45, 54, 55 and the outer circumferential surfaces of the outer rings 22, 23, 52, 53. The outer rings 23, 52, 53 of the second to fourth ball bearings 21, 32, 33 are firmly positioned with respect to the axial direction by the retaining rings 51, 59 and the caulking portion 62. With respect to the joining portions of the first housing element 16a and the front end portions of the electric motor 10a and the steering column 3, it is possible to obtain a firmly joined condition of metals by the mounting bracket 63 and the nut cylinders 66, 66.

In other words, with respect to a rolling bearing (the output shaft rolling bearing or the worm shaft rolling bearing) fitted into and supported by a synthetic resin housing element, the outer ring of the rolling bearing is fitted into and fixed to the synthetic resin housing element, not directly, but via a annular metal holder (the output shaft bearing holder or the worm shaft bearing holder).

When fixing the outer ring to the synthetic resin housing element by insert molding, heat and pressure generated by the insert molding may cause deformation or dropping off of components of the rolling bearing, or may cause grease enclosed inside the rolling bearing to be deteriorated or leaked. In contrast, according to the present embodiment, it is possible to avoid such drawbacks.

When the outer ring is fitted into and fixed to the synthetic resin housing element by interference fitting, creep (slipping in the circumferential direction) is likely to occur at the fitting portion. In contrast, when the outer ring is fitted into and fixed to the holder by interference fitting, creep is unlikely to occur at the fitting portion.

If the size of the holder in the axial direction is made larger than the size of the outer ring in the axial direction, and the bonding area of the holder with respect to the synthetic resin housing element is widened, the strength of joining of the holder with respect to the synthetic resin housing element is enhanced. Therefore, the strength of joining of the outer ring with respect to the synthetic resin housing element (via the holder) is enhanced. By forming notches or concave grooves on the holder, and by causing a portion of the synthetic resin for forming the housing element to enter the notches or concave grooves and become solidified, the strength of joining of the holder with respect to the housing element (creep resistance) is further enhanced.

In a case of positioning of the outer ring in the axial direction is performed by a retaining ring, if a locking groove for locking the retaining ring is formed on the inner circumferential surface of the synthetic resin housing element, due to the influence of the linear expansion coefficient or self-lubricating of the synthetic resin, firm positioning by the retaining ring becomes difficult. In contrast, if the locking groove is formed on the inner circumferential surface of the holder, firm positioning by the retaining ring can be performed. The locking groove can be easily formed on the inner circumferential surface of the holder, in a single piece condition before fixing the holder to the synthetic resin housing. Alternatively, the outer ring may be positioned with respect to the axial direction by forming a riveted portion at a portion of the holder.

Figure 5:
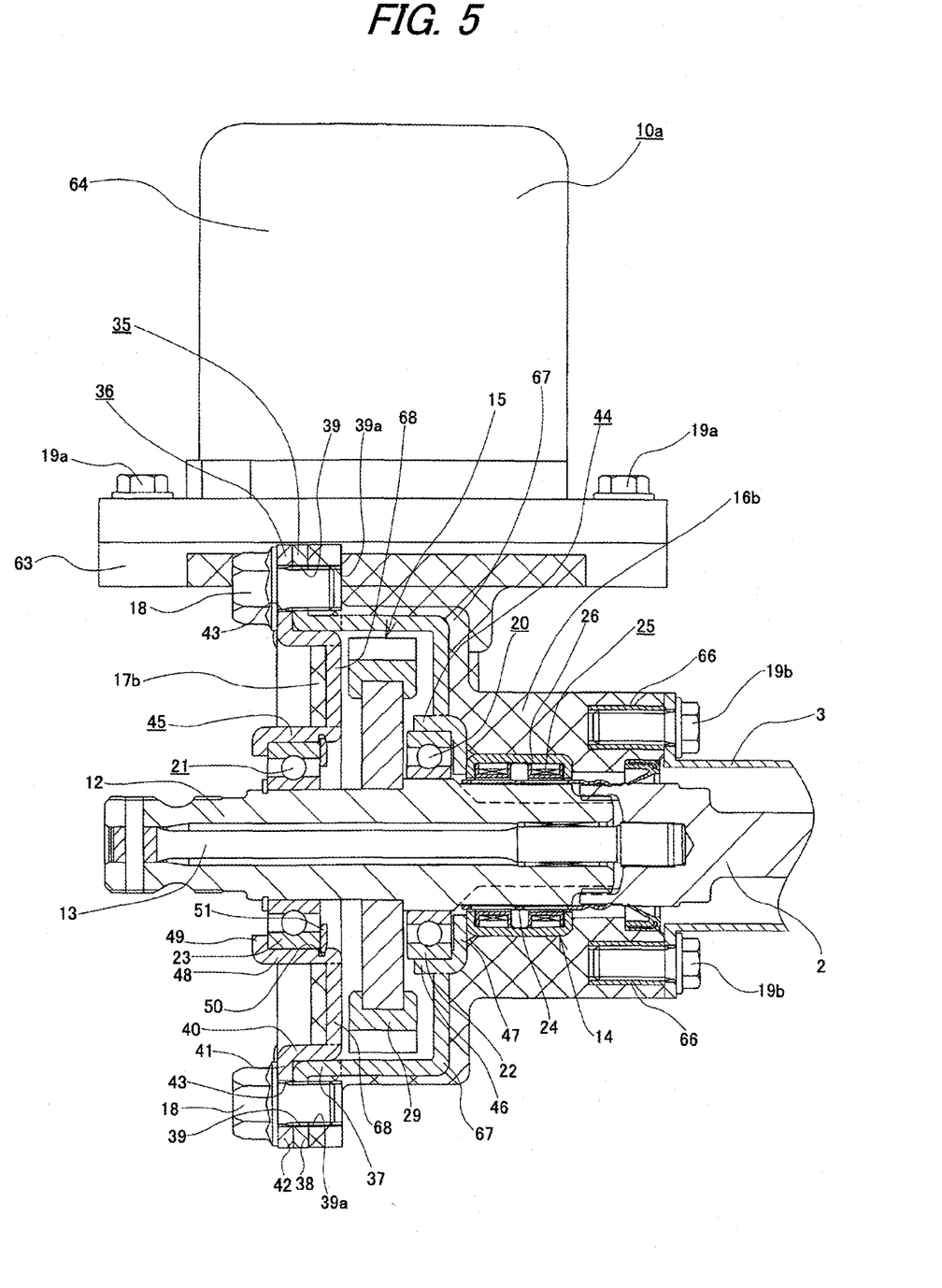
FIG. 5 is a sectional view of a power assist apparatus according to another embodiment of the present invention.
Figure 6:
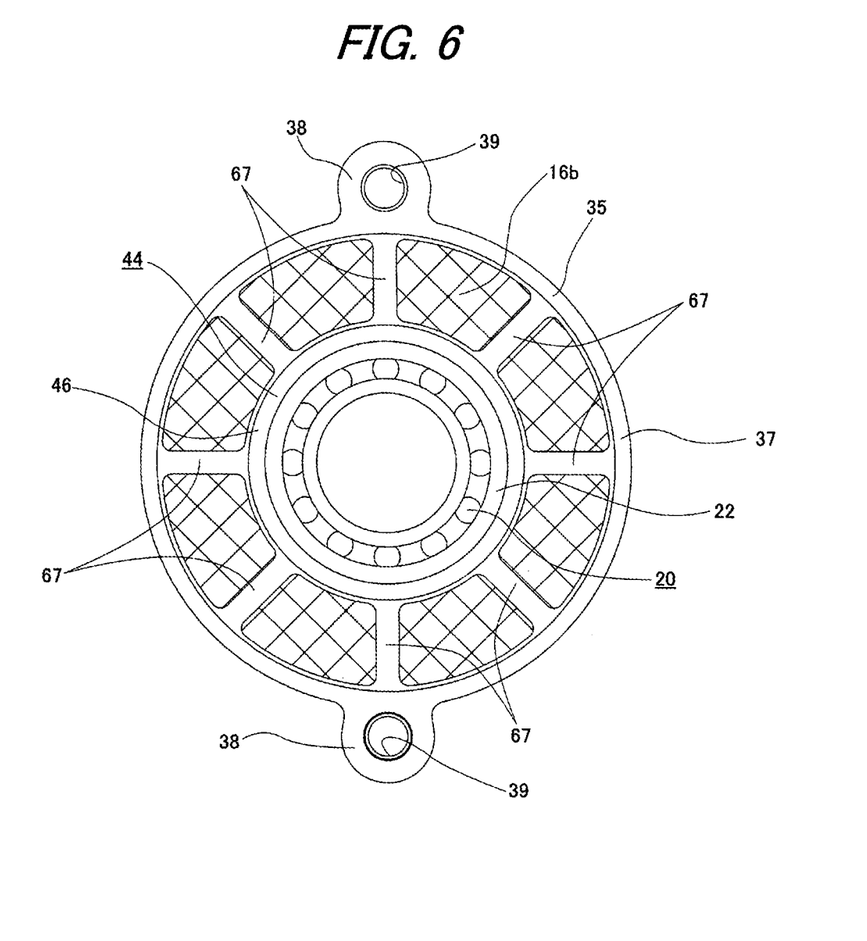
FIG. 6 is a front view of a portion of a first housing element of the power assist apparatus of FIG. 5, and a first holder and a first ball bearing fixed to the first housing element.
Figure 7:
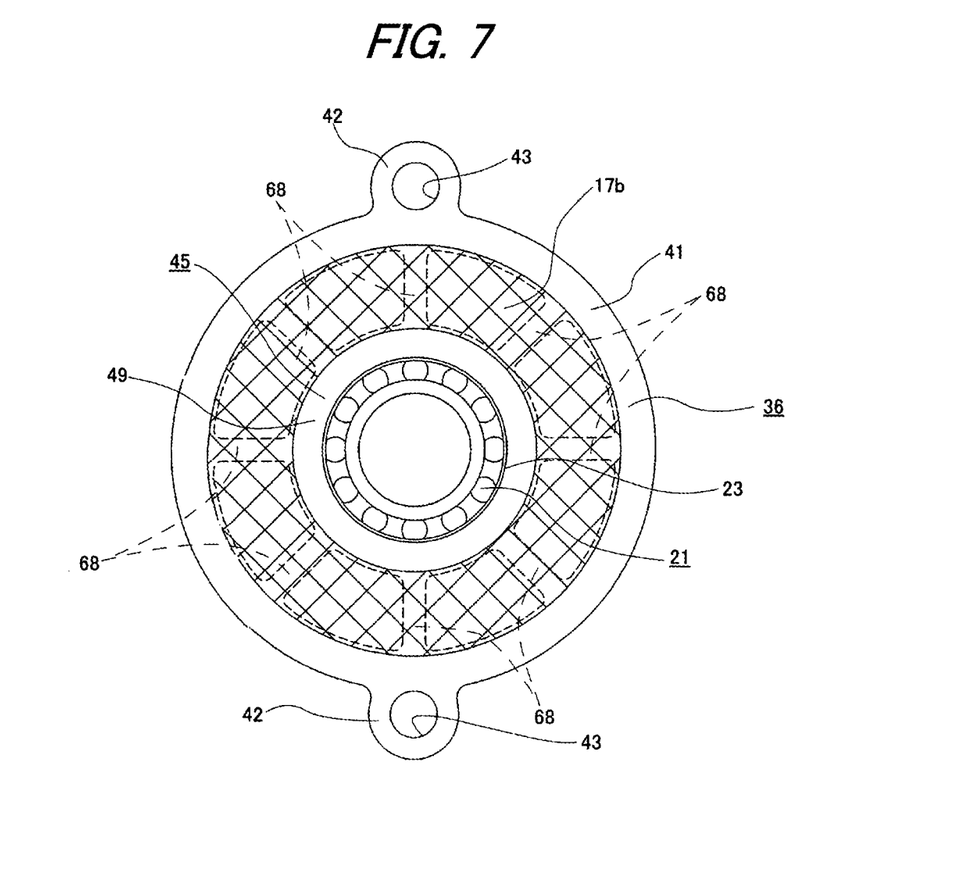
FIG. 7 is a front view of a second housing element of the power assist apparatus of FIG. 5, and a second holder and a second ball bearing fixed to the second housing element.

FIGS. 5 to 7 show a power assist apparatus according to another embodiment of the present invention. In this example, the first center aligning bracket 35 and the first holder 44 fixed to the first housing element 16a are formed integrally. For example, a plurality of portions of the rear end edge of the first cylindrical portion 37 of the first center aligning bracket 35 and a plurality of portions of an intermediate portion of the cylindrical portion 46 of the first holder 44 in the axial direction having the same phase in the circumferential direction are connected by L-shaped connecting portions 67 and 67. Further, the second center aligning bracket 36 and the second holder 45 fixed to the second housing element 17a are formed as one piece. For example, a plurality of portions of the rear end edge of the second cylindrical portion 40 of the second center aligning bracket 36 and a plurality of portions of the rear end edge of the cylindrical portion 48 of the second holder 45 having the same phase in the circumferential direction are connected by straight connecting portions 68 and 68.

According to the power assist apparatus having the configuration described above, since the first center aligning bracket 35 (the second center aligning bracket 36) and the first holder 44 (the second holder 45) are formed as one piece, it is possible to more sufficiently ensure the coaxiality of the members 35, 44 (36, 45), as compared to a case where the members 35, 44 (36, 45) are separate bodies. Therefore, it is possible to more sufficiently ensure the coaxiality of the first and second ball bearings 20, 21 fitted into and supported by first and second housing elements 16b, 17b, respectively. Since the first center aligning bracket 35 (the second center aligning bracket 36) and the first holder 44 (the second holder 45) are formed as one piece, it is possible to improve the rigidity of the first and second holders 44, 45. Therefore, it is possible to enhance the capability of bearing a load applied from the output shaft 12 to the first and second holders 44, 45 through the first and second ball bearings 20, 21. Since the first center aligning bracket 35 (the second center aligning bracket 36) and the first holder 44 (the second holder 45) are formed as one piece, even if the first housing element 16b (the second housing element 17b) is deformed due to influence according to an environmental change such as water absorption and a temperature change, the position of the first holder 44 (the second holder 45) is maintained. Therefore, it is possible to maintain the coaxiality of the first and second ball bearings 20, 21 fitted into the first and second holders 44, 45. Since the first center aligning bracket 35 (the second center aligning bracket 36) and the first holder 44 (the second holder 45) are formed as one piece, the size of one component which is inserted with respect to the first housing element 16b (the second housing element 17b) becomes large. Therefore, during injection molding of the first housing element 16b (the second housing element 17b), the amount of sink deformation occurring by the cooling and contraction of the synthetic resin is suppressed, and accordingly, the shape accuracy and size accuracy of the first housing element 16b (the second housing element 17b) is improved. Other configurations and effects are the same as those of the embodiment shown in FIGS. 1 to 4.

In the embodiments described above, both of the housing elements are made of synthetic resin. However, the present invention may be implemented with only one of the housing elements being made of synthetic resin.

This application is based on Japanese Patent Application No. 2011-211959 filed on Sep. 28, 2011, the content of which is incorporated herein by reference.

INDUSTRIAL APPLICABILITY

In the above-mentioned embodiments, the present invention is applied to a power assist apparatus which is used by being attached to the front end portion of a steering column. However, the present invention can also be applied to a power assist apparatus which is used by being attached to the input portion of a steering gear unit.

DESCRIPTION OF REFERENCE NUMERALS

1 Steering Wheel
2 Steering Shaft
3 Steering column
4 Power Assist Apparatus
10 Electric motor
11, 11a Housing
12 Output Shaft
15 Speed Reducer
16, 16a, 16b First Housing Element
17, 17a, 17b Second Housing Element
20 First Ball Bearing (Output Shaft Rolling Bearing)
21 Second Ball Bearing (Output Shaft Rolling Bearing)
22 Outer Ring
23 Outer Ring
25 Torque Sensor
29 Worm Wheel
30 Worm Shaft
31 Worm
32 Third Ball Bearing (Worm Shaft Rolling Bearing)
33 Fourth Ball Bearing (Worm Shaft Rolling Bearing)
34 Drive Shaft
35 First Center Aligning Bracket
36 Second Center Aligning Bracket
44 First Holder (Output Shaft Bearing Holder)
45 Second Holder (Output Shaft Bearing Holder)
52 Outer Ring
53 Outer Ring
54 Third Holder (Worm Shaft Bearing Holder)
55 Fourth Holder (Worm Shaft Bearing Holder)

The invention claimed is:

1. A power assist apparatus comprising:
an electric motor;
a speed reducer configured to increase a torque generated by the electric motor;
an annular torque sensor configured to detect a torque input from a steering wheel to a steering shaft attached to the steering wheel;
a housing in which the speed reducer and the torque sensor are arranged; and
an annular center aligning bracket made of metal,
wherein the housing comprises a first housing element and a second housing element, wherein one of the first housing element and the second housing element is made of a synthetic resin,
wherein the center aligning bracket is fixed to said one of the first housing element and the second housing element by insert molding such that the center aligning bracket is concentric to said one of the first housing element and the second housing element, and
wherein the first housing element and the second housing element are joined such that the first housing element and the second housing element are engaged with each other in an axial direction of the torque sensor via the center aligning bracket.

2. The power assist apparatus according to claim 1, wherein the speed reducer comprises a worm shaft connected to a drive shaft of the electric motor, a worm provided on the worm shaft, and a worm wheel meshed with the worm,
wherein the power assist apparatus further comprises:
an output shaft arranged along the axial direction inside the housing and onto which the worm wheel is fitted in a fixed manner;
an output shaft rolling bearing supporting the output shaft in a rotatable manner; and an annular output shaft bearing holder into which an outer ring of the output shaft rolling bearing is fitted in a fixed manner, and
wherein the output shaft bearing holder is made of a metal, and is fixed to said one of the first housing element and the second housing element such that the bearing holder is concentric to the center aligning bracket.

3. The power assist apparatus according to claim 2, wherein the center aligning bracket and the output shaft bearing holder are formed as one piece.

4. The power assist apparatus according to claim 2, wherein the torque sensor is positioned with respect to the axial direction by the output shaft bearing holder, and is fixed to said one of the first housing element and the second housing element.

5. The power assist apparatus according to claim 1, wherein the speed reducer comprises a worm shaft connected to a drive shaft of the electric motor, a worm provided on an intermediate portion of the worm shaft, and a worm wheel meshed with the worm,
   wherein the power assist apparatus further comprises:
   a pair of worm shaft rolling bearings supporting respective end portions of the worm shaft in a rotatable manner; and
   a pair of annular worm shaft bearing holders into which outer rings of the pair of worm shaft rolling bearings are fitted in a fixed manner respectively, and
   the pair of worm shaft bearing holders is made of a metal, and is fixed to said one of the first housing element and the second housing element such that the worm shaft bearing holders are concentric to one another.

* * * * *